(12) United States Patent
Jo et al.

(10) Patent No.: US 11,032,189 B2
(45) Date of Patent: Jun. 8, 2021

(54) METHOD FOR TRANSMITTING PACKET WHEN RADIO LINK FAILURE IS DETECTED IN WIRELESS COMMUNICATION SYSTEM AND APPARATUS THEREFOR

(71) Applicant: LG ELECTRONICS INC., Seoul (KR)

(72) Inventors: Geumsan Jo, Seoul (KR); Bokyung Byun, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 16/542,249

(22) Filed: Aug. 15, 2019

(65) Prior Publication Data

US 2020/0106700 A1    Apr. 2, 2020

(30) Foreign Application Priority Data

Sep. 28, 2018  (KR) .......................... 10-2018-0115449

(51) Int. Cl.
 *H04L 12/703*  (2013.01)
 *H04W 40/02*  (2009.01)
 *H04W 76/27*  (2018.01)
(52) U.S. Cl.
 CPC ............. *H04L 45/28* (2013.01); *H04W 40/02* (2013.01); *H04W 76/27* (2018.02)
(58) Field of Classification Search
 None
 See application file for complete search history.

(56) References Cited

U.S. PATENT DOCUMENTS

| 9,699,822 | B2 * | 7/2017 | Lee | H04L 1/1858 |
| 10,798,775 | B2 * | 10/2020 | Yu | H04W 76/25 |
| 2015/0304903 | A1 * | 10/2015 | Uchino | H04W 36/0055 370/331 |
| 2015/0334721 | A1 * | 11/2015 | Kim | H04W 72/02 370/330 |
| 2016/0255675 | A1 * | 9/2016 | Van Lieshout | H04W 76/25 370/329 |
| 2016/0285716 | A1 * | 9/2016 | Pelletier | H04L 43/0811 |
| 2017/0006580 | A1 * | 1/2017 | Patil | H04W 72/1289 |
| 2017/0031032 | A1 * | 2/2017 | Garin | G01S 19/55 |
| 2018/0279401 | A1 * | 9/2018 | Hong | H04J 11/0086 |

(Continued)

OTHER PUBLICATIONS

LG Electronics Inc, "Reaching maximum number of RLC retransmission with PDCP duplication", R2-1707340, Jun. 17, 2017 (Year: 2017).*

(Continued)

*Primary Examiner* — Ayaz R Sheikh
*Assistant Examiner* — Tarell A Hampton
(74) *Attorney, Agent, or Firm* — Lee Hong Degerman Kang Waimey

(57) ABSTRACT

A method for transmitting a packet by a Packet Data Convergence Protocol (PDCP) entity of a user equipment in a wireless communication system is disclosed. The method comprises delivering a packet to a first Radio Link Control (RLC) entity; and when a radio link failure (RLF) related to the first RLC entity is detected, retransmitting the packet through a second RLC entity if acknowledgement information of the packet is not received from the first RLC entity.

11 Claims, 12 Drawing Sheets

(56) References Cited

U.S. PATENT DOCUMENTS

2018/0310202 A1* 10/2018 Lohr ..................... H04L 1/1874
2020/0120569 A1*  4/2020 Baek ..................... H04W 12/08
2020/0127886 A1*  4/2020 Tang .................. H04L 41/0668
2020/0235869 A1*  7/2020 Pradas ................. H04L 1/1896

OTHER PUBLICATIONS

CATT, R2-1707923 "RLC failure and RLF in CA", Aug. 2017. (Year: 2017).*
Sharp, R2-1708259, "Impacts of PDCP Duplication RLF Triggering When Reaching Maximum Number of RLC Retransmission", Aug. 2017. (Year: 2017).*

* cited by examiner (a) Control-Plane Protocol Stack (b) User-Plane Protocol Stack (a)

(b)

METHOD FOR TRANSMITTING PACKET WHEN RADIO LINK FAILURE IS DETECTED IN WIRELESS COMMUNICATION SYSTEM AND APPARATUS THEREFOR

CROSS-REFERENCE TO RELATED APPLICATIONS

Pursuant to 35 U.S.C. § 119(a), this application claims the benefit of earlier filing date and right of priority to KR Patent Application No. 10-2018-0115449, filed on Sep. 28, 2018, the contents of which are hereby incorporated by reference herein in their entirety.

BACKGROUND OF THE INVENTION

Field of the Invention

The present invention relates to a wireless communication system, and more particularly, to a method for transmitting a packet when radio link failure (RLF) is detected in a wireless communication system and an apparatus therefor.

Discussion of the Related Art

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information. In particular, overcoming delay or latency has become an important challenge in applications whose performance critically depends on delay/latency.

SUMMARY OF THE INVENTION

Accordingly, the present invention is directed to a method for transmitting a packet when radio link failure (RLF) is detected in a wireless communication system and an apparatus therefor, which substantially obviate one or more problems due to limitations and disadvantages of the related art.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

A method for transmitting a packet by a Packet Data Convergence Protocol (PDCP) entity of a user equipment in a wireless communication system according to the embodiment of the present invention comprises the steps of delivering a packet to a first Radio Link Control (RLC) entity; and when a radio link failure (RLF) related to the first RLC entity is detected, retransmitting the packet through a second RLC entity if acknowledgement information of the packet is not received from the first RLC entity.

Further, a user equipment (UE) in a wireless communication system according to the present invention comprises a memory; and at least one processor coupled to the memory and configured to deliver a packet to a first Radio Link Control (RLC) entity by a Packet Data Convergence Protocol (PDCP) entity; and when a radio link failure (RLF) related to the first RLC entity is detected, retransmit the packet through a second RLC entity by the PDCP entity if acknowledgement information of the packet is not received from the first RLC entity.

Preferably, the UE may receive retransmission triggering information for the packet from an upper layer entity by the PDCP entity, when the RLF is detected.

Preferably, the upper layer entity is a radio resource control (RRC) entity. In this case, the RRC entity determines whether the RLF related to the first RLC entity is detected or not, and then generating the retransmission triggering information for the packet.

More preferably, the packet is retransmitted through the second RLC entity without any indication of a network.

Preferably, the at least one processor is further configured to implement at least one advanced driver assistance system (ADAS) function based on signals that control the UE It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE PREFERRED EMBODIMENTS

The technical objects that can be achieved through the present disclosure are not limited to what has been particularly described hereinabove and other technical objects not described herein will be more clearly understood by persons skilled in the art from the following detailed description.

Figure 1:
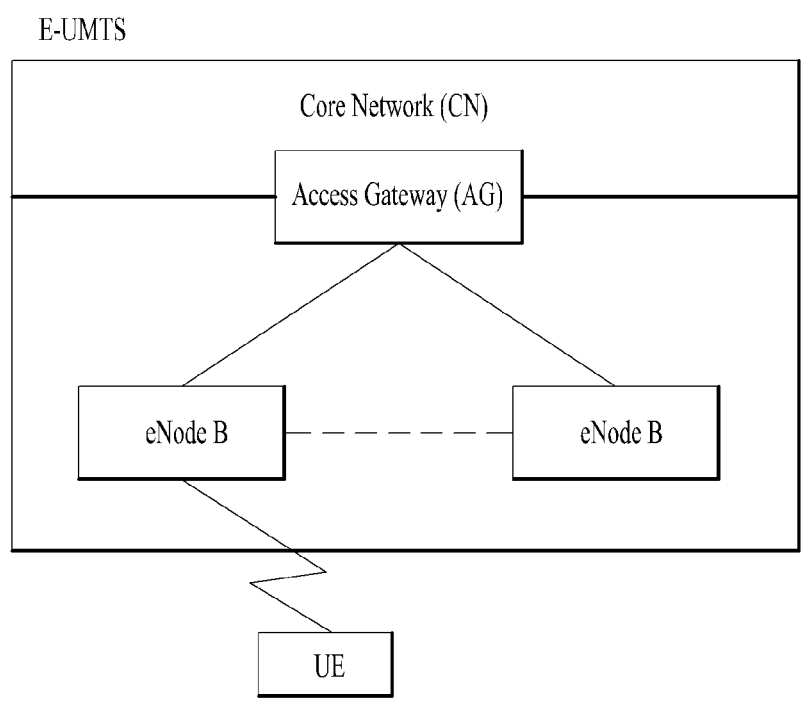
FIG. 1 is a diagram illustrating an example of a network structure of an evolved universal mobile telecommunication system (E-UMTS) as an exemplary radio communication system.

FIG. 1 is a diagram illustrating an example of a network structure of an E-UMTS as an exemplary radio communication system. An Evolved Universal Mobile Telecommunications System (E-UMTS) is an advanced version of a Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information about DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information about UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, implementations of the present disclosure are described in regards to a 3GPP based wireless communication system. However, the technical features of the present disclosure are not limited thereto. For example, although the following detailed description is given based on a mobile communication system corresponding to a 3GPP based system, aspects of the present disclosure that are not limited to 3GPP based system are applicable to other mobile communication systems.

For example, the present disclosure is applicable to contention based communication such as Wi-Fi as well as contention free communication as in the 3GPP based system in which a BS allocates a DL/UL time/frequency resource to a UE and the UE receives a DL signal and transmits a UL signal according to resource allocation of the BS. In a contention free communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present disclosure, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB.

In the present disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, a cell refers to a prescribed geographical area to which one or more nodes provide a communication service. Accordingly, in the present disclosure, communicating with a specific cell may include communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell.

In some scenarios, a 3GPP based system implements a cell to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

In some scenarios, the recent 3GPP based wireless communication standard implements a cell to manage radio resources. The "cell" associated with the radio resources utilizes a combination of downlink resources and uplink resources, for example, a combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency may be a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell refers to a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present disclosure, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present disclosure, monitoring a channel refers to attempting to decode the channel. For example, monitoring a PDCCH refers to attempting to decode PDCCH(s) (or PDCCH candidates).

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 3GPP TS 38.211, 3GPP TS 38.213, 3GPP TS 38.214, 3GPP TS 38.300, 3GPP TS 38.321, 3GPP TS 38.322, 3GPP TS 38.323 and 3GPP TS 38.331 may be referenced.

Figure 2:
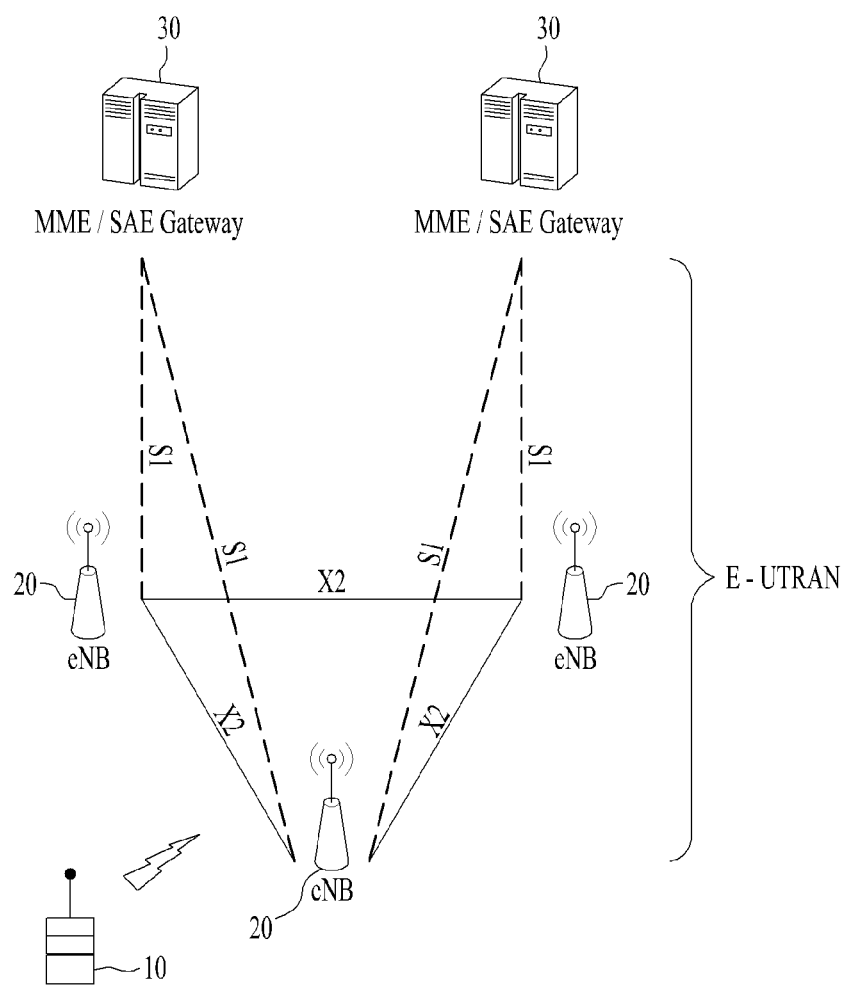
FIG. 2 is a block diagram illustrating an example of an evolved universal terrestrial radio access network (E-UTRAN)

FIG. 2 is a block diagram illustrating an example of an evolved universal terrestrial radio access network (E-UTRAN). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipments (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from BS 20 to UE 10, and "uplink" refers to communication from the UE to a BS.

Figure 3:
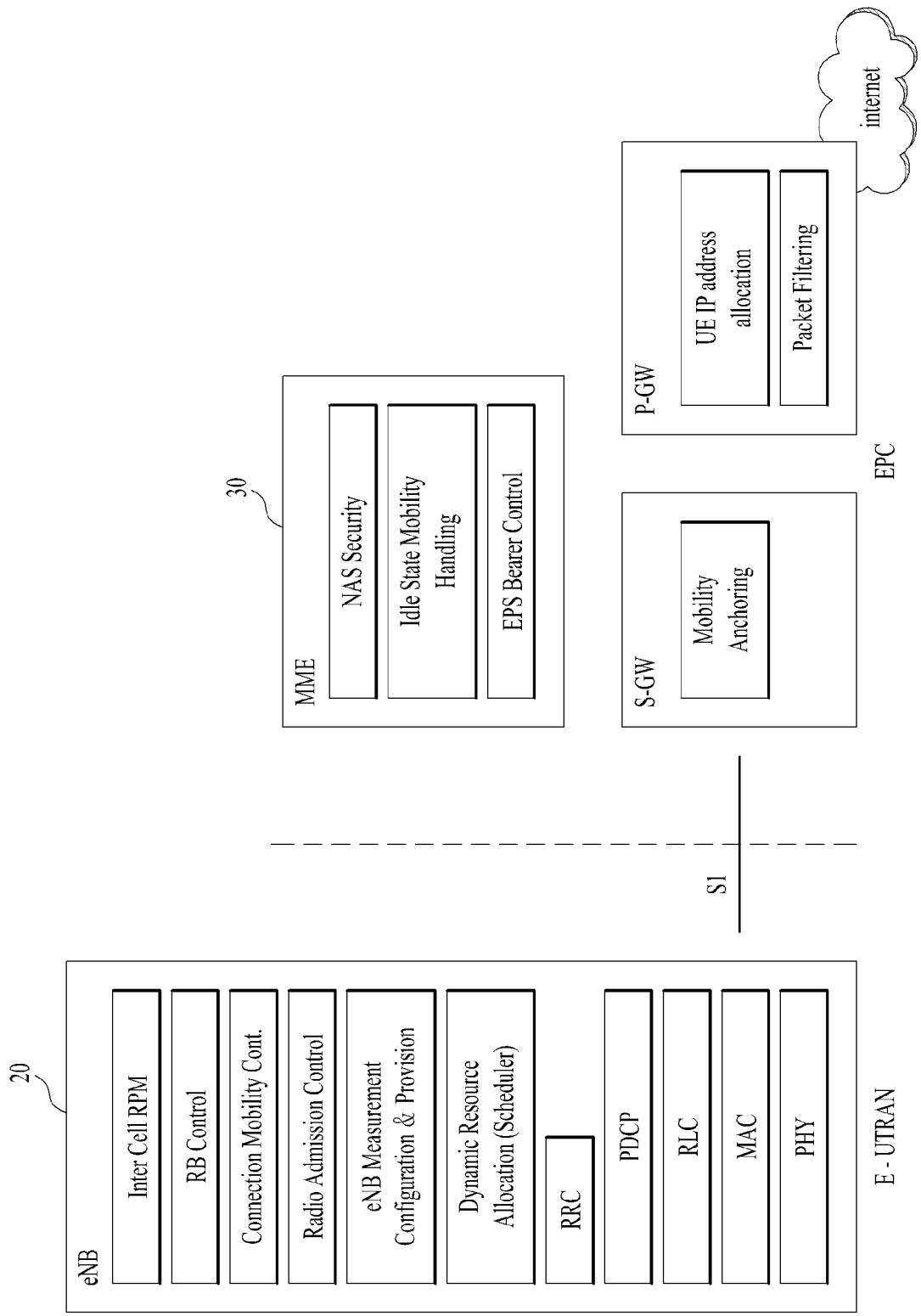
FIG. 3 is a block diagram depicting an example of an architecture of a typical E-UTRAN and a typical EPC.

FIG. 3 is a block diagram depicting an example of an architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, access stratum (AS) Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
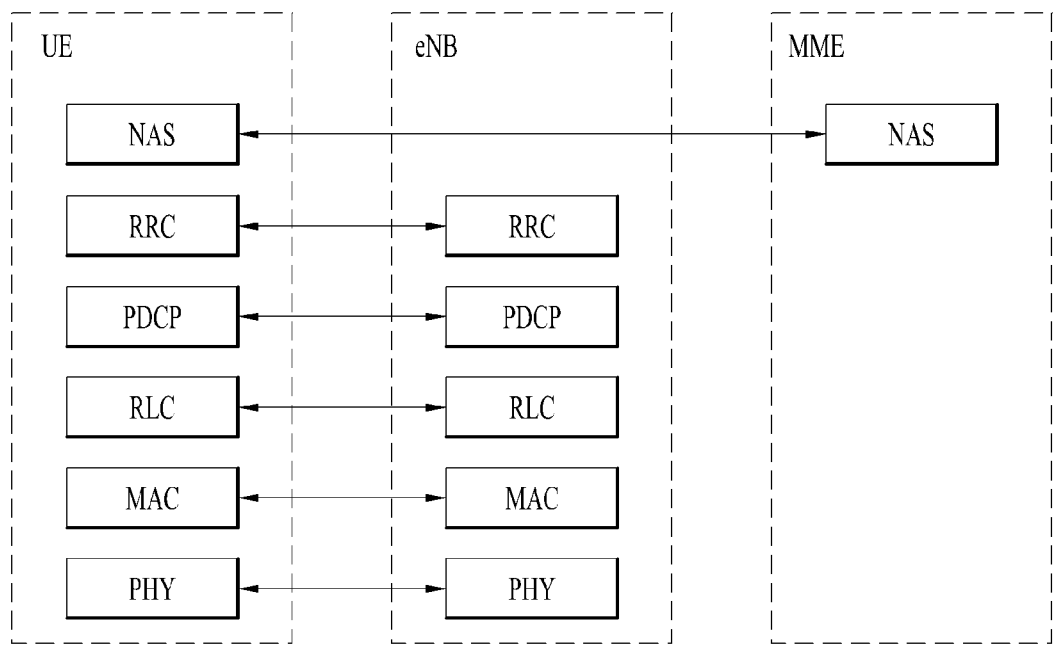
FIG. 4 is a diagram showing an example of a control plane and a user plane of a radio interface protocol between a UE and an E-UTRAN based on a 3GPP radio access network standard.
Figure 4:
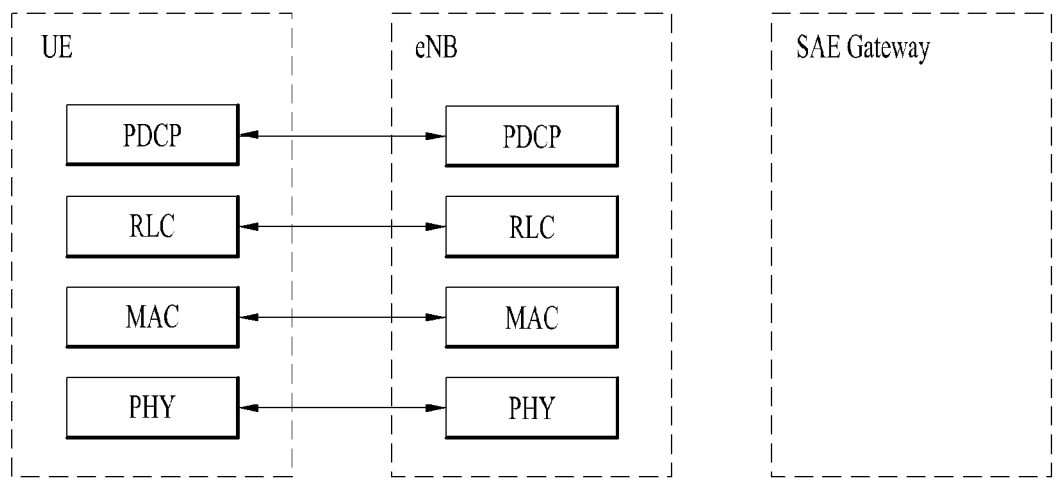

FIG. 4 is a diagram showing an example of a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the 3GPP LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

The main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ; priority handling between logical channels of one UE; priority handling between UEs by dynamic scheduling; MBMS service identification; transport format selection; and padding.

The main services and functions of the RLC sublayer include: transfer of upper layer protocol data units (PDUs); error correction through ARQ (only for acknowledged mode (AM) data transfer); concatenation, segmentation and reassembly of RLC service data units (SDUs) (only for unacknowledged mode (UM) and acknowledged mode (AM) data transfer); re-segmentation of RLC data PDUs (only for AM data transfer); reordering of RLC data PDUs (only for UM and AM data transfer); duplicate detection (only for UM and AM data transfer); protocol error detection (only for AM data transfer); RLC SDU discard (only for UM and AM data transfer); and RLC re-establishment, except for a NB-IoT UE that only uses Control Plane CIoT EPS optimizations.

The main services and functions of the PDCP sublayer for the user plane include: header compression and decompression (ROHC only); transfer of user data; in-sequence delivery of upper layer PDUs at PDCP re-establishment procedure for RLC AM; for split bearers in DC and LWA bearers (only support for RLC AM), PDCP PDU routing for transmission and PDCP PDU reordering for reception; duplicate detection of lower layer SDUs at PDCP re-establishment procedure for RLC AM; retransmission of PDCP SDUs at handover and, for split bearers in DC and LWA bearers, of PDCP PDUs at PDCP data-recovery procedure, for RLC AM; ciphering and deciphering; timer-based SDU discard in uplink. The main services and functions of the PDCP for the control plane include: ciphering and integrity protection; and transfer of control plane data. For split and LWA bearers, PDCP supports routing and reordering. For DRBs mapped on RLC AM and for LWA bearers, the PDCP entity uses the reordering function when the PDCP entity is associated with two AM RLC entities, when the PDCP entity is configured for a LWA bearer; or when the PDCP entity is associated with one AM RLC entity after it was, according to the most recent reconfiguration, associated with two AM RLC entities or configured for a LWA bearer without performing PDCP re-establishment.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

In LTE, one cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
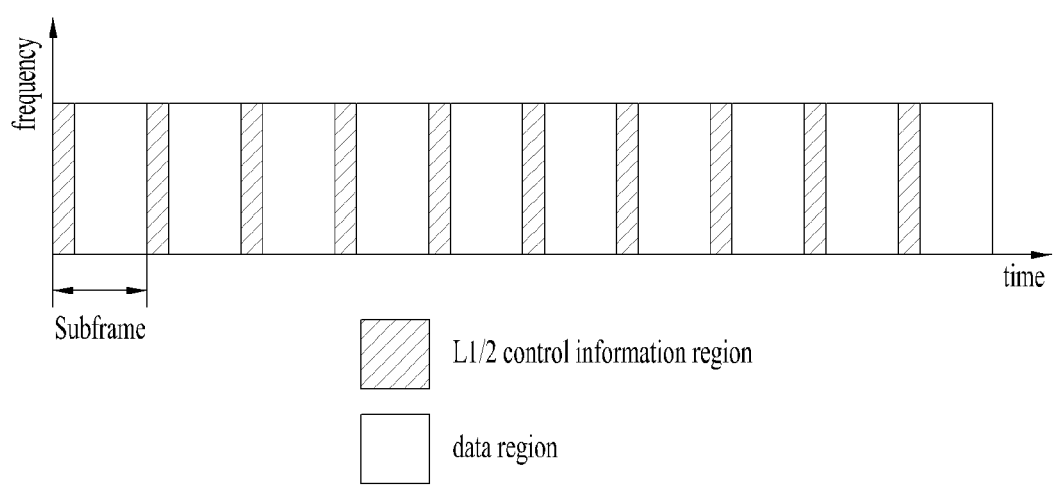
FIG. 5 is a diagram showing an example of a physical channel structure used in an E-UMTS system.

FIG. 5 is a diagram showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one implementation, a radio frame of 10 ms is used and one radio frame includes 10 subframes. In addition, in LTE, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the 3GPP LTE/LTE-A system, an opportunity of transmission of an UL grant or a DL grant is present every 1 ms, and the UL/DL grant opportunity does not exists several times in less than 1 ms. Therefore, the TTI in the legacy 3GPP LTE/LTE-A system is 1 ms.

A base station and a UE mostly transmit/receive data via a PDSCH, which is a physical channel, using a downlink shared channel (DL-SCH) which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one implementation, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receives the PDSCH indicated by B and C in the PDCCH information. In the present disclosure, a PDCCH addressed to an RNTI refers to the PDCCH being cyclic redundancy check masked (CRC-masked) with the RNTI. A UE may attempt to decode a PDCCH using the certain RNTI if the UE is monitoring a PDCCH addressed to the certain RNTI.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency, and cost efficiency. To meet the above ever-increasing requirements from market and mobile communication society, next generation access technologies are expected to emerge in the near future.

Building upon its success of IMT-2000 (3G) and IMT-Advanced (4G), 3GPP has been devoting its effort to IMT-2020 (5G) development since September 2015. 5G New Radio (NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC). eMBB is targeting high data rate mobile broadband services, such as seamless data access both indoors and outdoors, and AR/VR applications; URLLC is defined for applications that have stringent latency and reliability requirements, such as vehicular communications that can enable autonomous driving and control network in industrial plants; mMTC is the basis for connectivity in IoT, which allows for infrastructure management, environmental monitoring, and healthcare applications.

Figure 6:
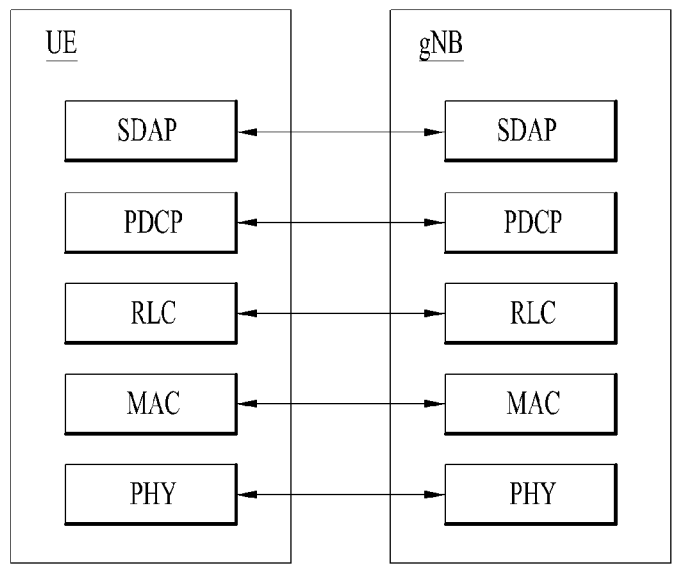
FIG. 6 illustrates an example of protocol stacks of a next generation wireless communication system.
Figure 6:
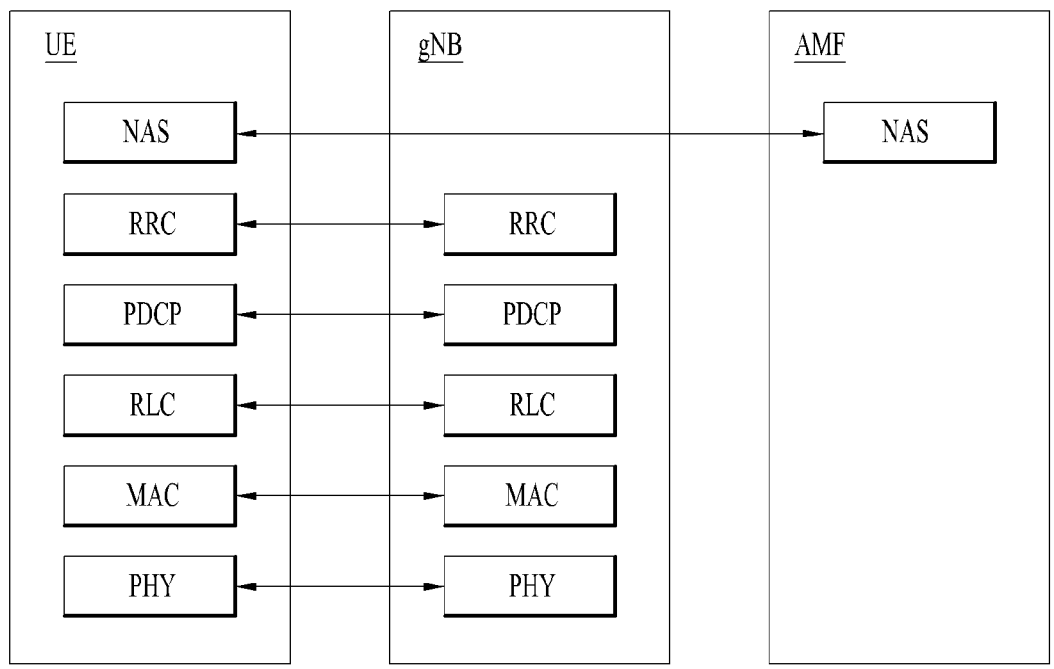

FIG. 6 illustrates an example of protocol stacks of a next generation wireless communication system. In particular, FIG. 6(a) illustrates an example of a radio interface user plane protocol stack between a UE and a gNB and FIG. 6(b) illustrates an example of a radio interface control plane protocol stack between a UE and a gNB.

The control plane refers to a path through which control messages used to manage call by a UE and a network are transported. The user plane refers to a path through which data generated in an application layer, for example, voice data or Internet packet data are transported.

Referring to FIG. 6(a), the user plane protocol stack may be divided into a first layer (Layer 1) (i.e., a physical layer (PHY) layer) and a second layer (Layer 2).

Referring to FIG. 6(b), the control plane protocol stack may be divided into Layer 1 (i.e., a PHY layer), Layer 2, Layer 3 (e.g., a radio resource control (RRC) layer), and a non-access stratum (NAS) layer.

The overall protocol stack architecture for the NR system might be similar to that of the LTE/LTE-A system, but some functionalities of the protocol stacks of the LTE/LTE-A system should be modified in the NR system in order to resolve the weakness or drawback of LTE. RAN WG2 for NR is in charge of the radio interface architecture and protocols. The new functionalities of the control plane include the following: on-demand system information delivery to reduce energy consumption and mitigate interference, two-level (i.e. Radio Resource Control (RRC) and Medium Access Control (MAC)) mobility to implement seamless handover, beam based mobility management to accommodate high frequency, RRC inactive state to reduce state transition latency and improve UE battery life. The new functionalities of the user plane aim at latency reduction by optimizing existing functionalities, such as concatenation and reordering relocation, and RLC out of order delivery. In addition, a new user plane AS protocol layer named as Service Data Adaptation Protocol (SDAP) has been introduced to handle flow-based Quality of Service (QoS) framework in RAN, such as mapping between QoS flow and a data radio bearer, and QoS flow ID marking. Hereinafter the layer 2 according to the current agreements for NR is briefly discussed.

The layer 2 of NR is split into the following sublayers: Medium Access Control (MAC), Radio Link Control (RLC), Packet Data Convergence Protocol (PDCP) and Service Data Adaptation Protocol (SDAP). The physical layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers, and the SDAP sublayer offers to 5GC QoS flows. Radio bearers are categorized into two groups: data radio bearers (DRB) for user plane data and signalling radio bearers (SRB) for control plane data.

The main services and functions of the MAC sublayer of NR include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per carrier in case of carrier aggregation); priority handling between UEs by dynamic scheduling; priority handling between logical channels of one UE by logical channel prioritization; and padding. A single MAC entity can support one or multiple numerologies and/or transmission timings, and mapping restrictions in logical channel prioritisation controls which numerology and/or transmission timing a logical channel can use.

The RLC sublayer of NR supports three transmission modes: Transparent Mode (TM); Unacknowledged Mode (UM); Acknowledged Mode (AM). The RLC configuration is per logical channel with no dependency on numerologies and/or TTI durations, and ARQ can operate on any of the numerologies and/or TTI durations the logical channel is configured with. For SRB0, paging and broadcast system information, TM mode is used. For other SRBs AM mode used. For DRBs, either UM or AM mode are used. The main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; Reassembly of SDU (AM and UM); duplicate detection (AM only); RLC SDU discard (AM and UM); RLC re-establishment; and protocol error detection (AM only). The ARQ within the RLC sublayer of NR has the following characteristics: ARQ retransmits RLC PDUs or RLC PDU segments based on RLC status reports; polling for RLC status report is used when needed by RLC; and RLC receiver can also trigger RLC status report after detecting a missing RLC PDU or RLC PDU segment.

The main services and functions of the PDCP sublayer of NR for the user plane include: sequence numbering; header compression and decompression (ROHC only); transfer of user data; reordering and duplicate detection; PDCP PDU routing (in case of split bearers); retransmission of PDCP SDUs; ciphering, deciphering and integrity protection; PDCP SDU discard; PDCP re-establishment and data recovery for RLC AM; and duplication of PDCP PDUs. The main services and functions of the PDCP sublayer of NR for the control plane include: sequence numbering; ciphering, deciphering and integrity protection; transfer of control plane data; reordering and duplicate detection; and duplication of PDCP PDUs.

The main services and functions of SDAP include: mapping between a QoS flow and a data radio bearer; marking QoS flow ID (QFI) in both DL and UL packets. A single protocol entity of SDAP is configured for each individual PDU session. Compared to LTE's QoS framework, which is bearer-based, the 5G system adopts the QoS flow-based framework. The QoS flow-based framework enables flexible mapping of QoS flow to DRB by decoupling QoS flow and the radio bearer, allowing more flexible QoS characteristic configuration.

The main services and functions of RRC sublayer of NR include: broadcast of system information related to access stratum (AS) and non-access stratum (NAS); paging initiated by a 5GC or an NG-RAN; establishment, maintenance, and release of RRC connection between a UE and a NG-RAN (which further includes modification and release of carrier aggregation and further includes modification and release of the DC between an E-UTRAN and an NR or in the NR; a security function including key management; establishment, configuration, maintenance, and release of SRB(s) and DRB(s); handover and context transfer; UE cell selection and re-release and control of cell selection/re-selection; a mobility function including mobility between RATs; a QoS management function, UE measurement report, and report control; detection of radio link failure and discovery from radio link failure; and NAS message transfer to a UE from a NAS and NAS message transfer to the NAS from the UE.

Hereinafter, 5G communication system is briefly introduced.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Figure 7:
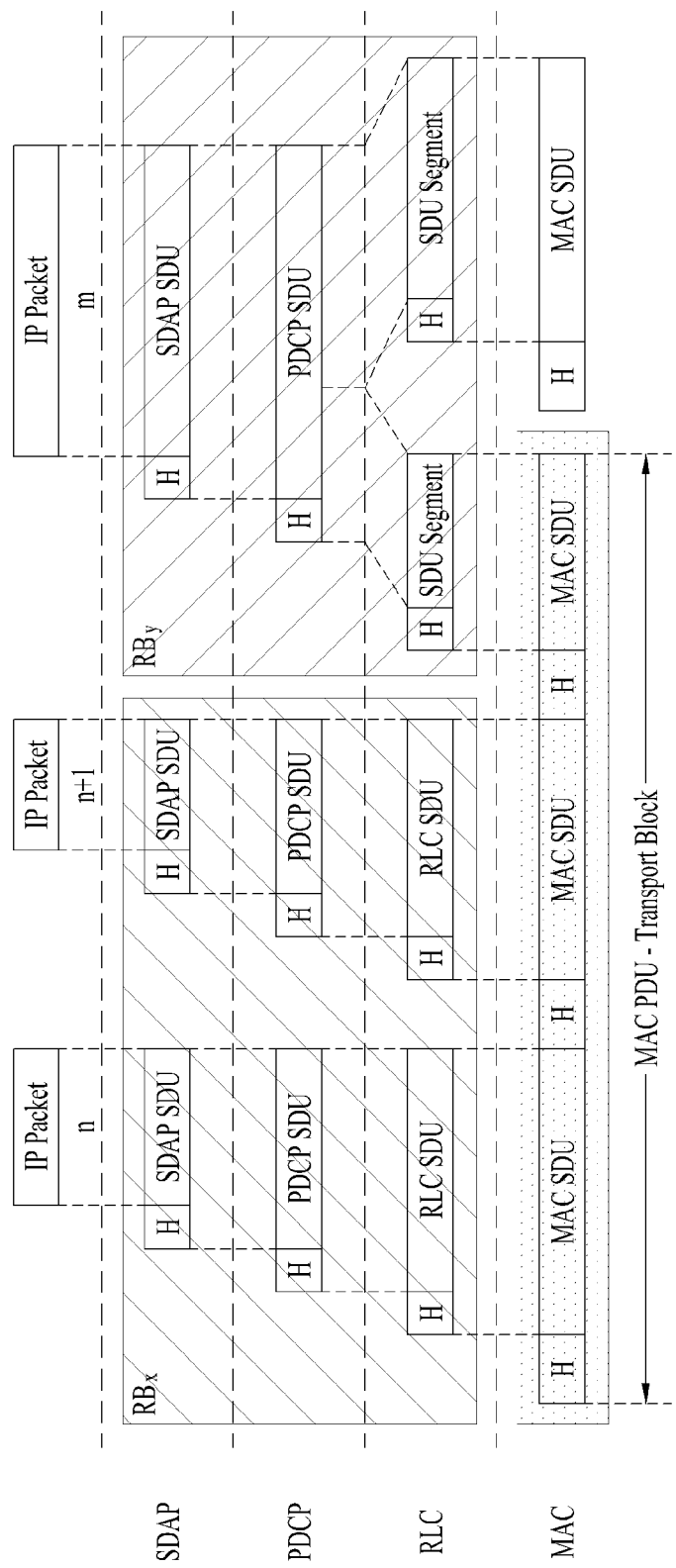
FIG. 7 illustrates an example of a data flow example at a transmitting device in the NR system.

FIG. 7 illustrates a data flow example at a transmitting device in the NR system.

In FIG. 7, an RB denotes a radio bearer. Referring to FIG. 7, a transport block is generated by MAC by concatenating two RLC PDUs from RBx and one RLC PDU from RBy. In FIG. 7, the two RLC PDUs from RBx each corresponds to one IP packet (n and n+1) while the RLC PDU from RBy is a segment of an IP packet (m). In NR, a RLC SDU segment can be located in the beginning part of a MAC PDU and/or in the ending part of the MAC PDU. The MAC PDU is transmitted/received using radio resources through a physical layer to/from an external device.

Figure 8:
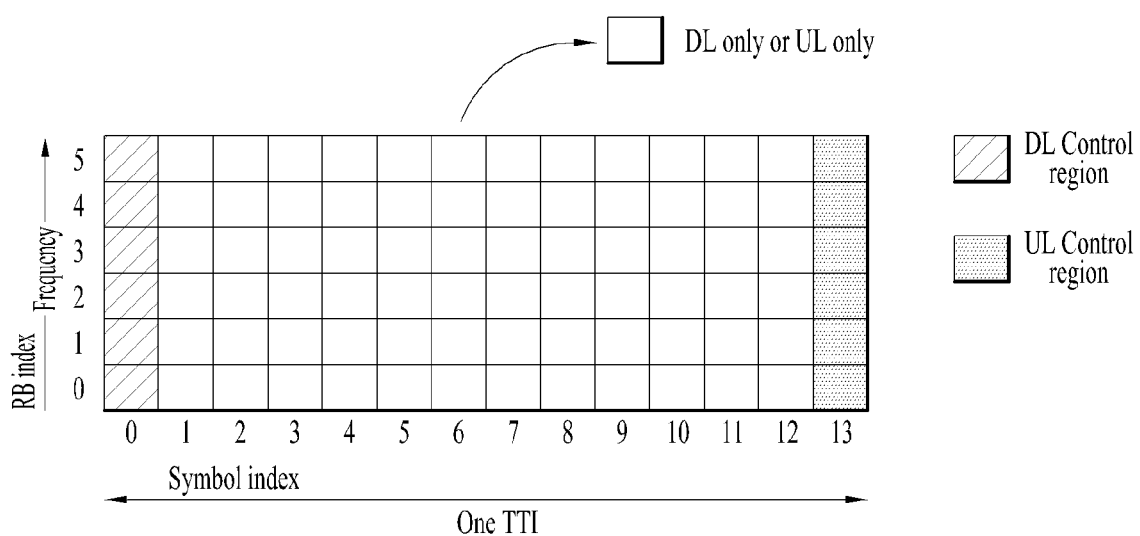
FIG. 8 illustrates an example of a slot structure available in a new radio access technology (NR)

FIG. 8 illustrates an example of a slot structure available in a new radio access technology (NR).

To reduce or minimize data transmission latency, in a 5G new RAT, a slot structure in which a control channel and a data channel are time-division-multiplexed is considered.

In the example of FIG. 8, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In the example of FIG. 8, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 8, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present disclosure, the DL control channel may be locally transmitted or distributively transmitted in a partial frequency band in a system band, i.e., a channel band.

In the NR system, the basic transmission unit is a slot. A duration of the slot includes 14 symbols having a normal cyclic prefix (CP) or 12 symbols having an extended CP. In addition, the slot is scaled in time as a function of a used subcarrier spacing.

Hereinafter, data transmit operations of the PDCP entity according to the NR system are described.

At reception of a PDCP SDU from upper layers, the transmitting PDCP entity shall start the discardTimer associated with this PDCP SDU (if configured). For a PDCP SDU received from upper layers, the transmitting PDCP entity shall associate the COUNT value corresponding to a parameter TX_NEXT to this PDCP SDU, perform header compression of the PDCP SDU and perform integrity protection, and ciphering using the TX_NEXT. Then, the transmitting PDCP entity shall set the PDCP SN of the PDCP Data PDU to TX_NEXT modulo $2^{[pdcp\text{-}SN\text{-}Size]}$ increment TX_NEXT by one, and submit the resulting PDCP Data PDU to lower layer as specified below.

When submitting a PDCP PDU to lower layer, the transmitting PDCP entity shall submit the PDCP PDU to the associated RLC entity if the transmitting PDCP entity is associated with one RLC entity. Else, if the transmitting PDCP entity is associated with two RLC entities and if the PDCP duplication is activated and if the PDCP PDU is a PDCP Data PDU, the transmitting PDCP entity shall duplicate the PDCP Data PDU and submit the PDCP Data PDU to both associated RLC entities. However, if the PDCP PDU is not the PDCP Data PDU, the transmitting PDCP entity shall submit the PDCP Control PDU to the primary RLC entity.

For acknowledgement mode (AM) data radio bearers (DRBs), when upper layers request a PDCP data recovery for a radio bearer, the transmitting PDCP entity shall perform retransmission of all the PDCP Data PDUs previously submitted to re-established or released AM RLC entity in ascending order of the associated COUNT values for which the successful delivery has not been confirmed by lower layers, following the above-mentioned data transmit operations of the PDCP entity.

After performing the above procedures, the transmitting PDCP entity shall follow the above-mentioned data transmit operations of the PDCP entity.

Recently, in the NR system, an autonomous path change is discussed. When a UE detects a problem on one of the transmission paths, (for example, MCG (Master Cell Group) and SCG (Secondary Cell Group)), the UE autonomously restricts the transmission of the packet to the problematic path. After that, for recovery of the problematic path, the UE transmits a packet including the information of the link problem to the other path.

For example, if the UE detects a radio link failure (RLF) on the MCG path, the UE restricts the transmission of the packet to the MCG path. After that, the UE transmits the packet including the information of the MCG path problem to the SCG path.

However, even if the UE transmits the packet including the information of the MCG path problem to the SCG path, the MCG path may not be recovered. This is because that if at least one packet transmitted to the MCG path is not successfully delivered, the gNB does not process the packet including the information of the MCG path problem before receiving all packets transmitted to the MCG path. Consequently, the packets, which were transmitted to the MCG path and were not successfully delivered, should be retransmitted.

To retransmit the packets, which were transmitted to the problematic path and were not successfully delivered, the gNB should indicate the data recovery procedure to the UE. However, the gNB does not indicate the data recovery procedure since gNB does not know that the UE has the problem on one of the transmission path.

Thus, for fast recovery of the problematic link, the UE should autonomously retransmit the packets, which were transmitted to the problematic path and were not successfully delivered, to the SCG link without an indication from the gNB.

According to the present invention, if a UE is configured with more than two transmission paths, and if the UE detects a problem on a transmission path (e.g., MCG radio link failure or SCG failure), the UE autonomously retransmits packets which were transmitted to the problematic path but the successful delivery have not been confirmed to the other path. On the transmission path where the problem is detected, the UE does not transmit packets any more.

Figure 9:
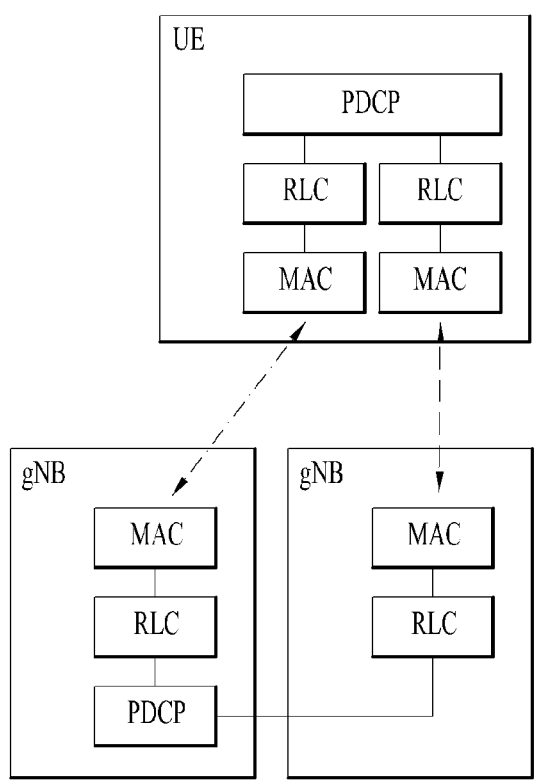
FIG. 9 shows an example of a UE configured with two transmission paths.

FIG. 9 shows an example of a UE configured with two transmission paths.

Preferably, each path is associated with different Cell Group. That is, one path is associated with MCG, and the other is associated with SCG. In this case, one PDCP entity is associated with two RLC entities and two MAC entities as shown in FIG. 9.

In another example, each path is associated with different Cell within a same Cell Group. That is, one path is associated with Cell1 of MCG, and the other is associated with Cell2 of MCG. In this case, one PDCP entity is associated with two RLC entities and one MAC entity.

The packet can be control message generated by the RRC or the NAS. In addition, the packet can be a data packet generated by the application layer.

Figure 10:
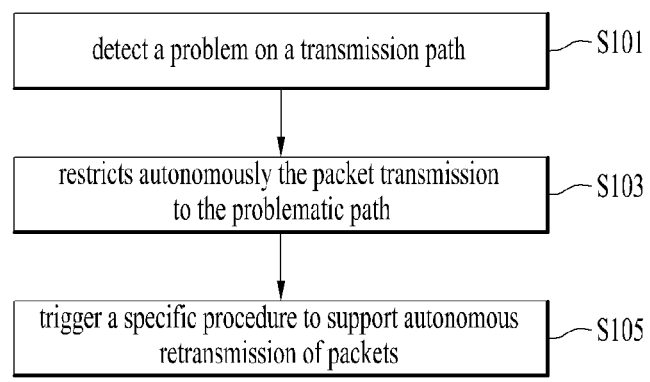
FIG. 10 shows a flow chart of UE operations according to the present invention.

FIG. 10 shows a flow chart of UE operations according to the present invention.

Referring to FIG. 10, if the UE detects a problem on a transmission path (S101), the UE autonomously restricts the packet transmission to the problematic path (S103).

Preferably, example of the problem of the transmission path is shown below:
MCG radio link failure;
SCG failure, i.e., SCG radio link failure;
RLC retransmission error
Random Access failure
Integrity verification failure After restricting the packet transmission to the problematic path, the UE triggers a specific procedure to support autonomous retransmission of packets (S105). Preferably, an example of the specific procedure is listed below:
PDCP Data recovery procedure;
PDCP Re-establishment procedure;
Retransmission procedure More preferably, the autonomous retransmission of packets means that the UE autonomously retransmits packets without any indication from the network.

For retransmission procedure, the UE retransmits the packets which were transmitted to the problematic path but the successful delivery have not been confirmed to the other path. Only the packets transmitted to the problematic path are considered to be retransmitted to the other path. Alternatively, all packets transmitted to the problematic path are considered to be retransmitted to the other path.

The specific procedure is performed in a PDCP entity of the UE. The PDCP entity of the UE receives the successful delivery confirmation for each packet from RLC.

The retransmitted packet can be transmitted via PUSCH or PUCCH. Further, this invention can be applied to the SRBs and AM DRBs.

Figure 11:
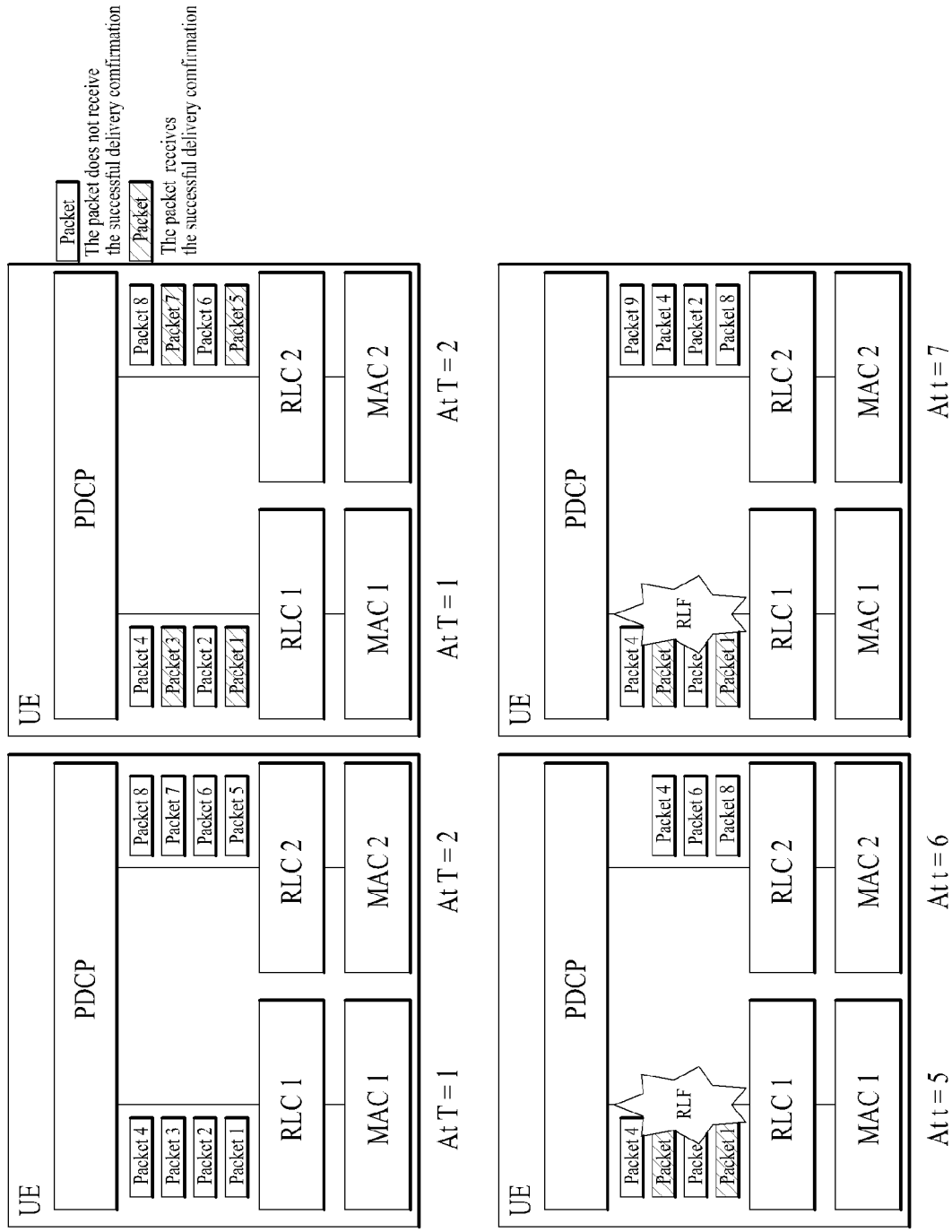
FIG. 11 shows an example of a fast recovery procedure according to the present invention.

FIG. 11 shows an example of a fast recovery procedure according to the present invention. Especially, in FIG. 11, it is assumed that a UE can transmit the packet to either path 1 or path 2. Further, it is assumed that the PDCP entity is associated with RLC 1 entity and RLC 2 entity, and that the MAC 1 is entity associated with SCG and the MAC 2 entity is associated with MCG.

At T=1: The PDCP entity transmits the packet 1, 2, 3, and 4 to the path 1.

At T=2: The PDCP entity transmits the packet 5, 6, 7, and 8 to the path 2.

At T=3: The PDCP entity receives successful delivery confirmation for packet 1 and 3 from the RLC 1 entity.

At T=4: The PDCP entity receives successful delivery confirmation for packet 5, 6, and 7 from the RLC 2 entity.

At T=5: The UE detects the radio link failure on the path 1 and the UE restricts the packet transmission to the path 1.

At T=6: The UE performs the autonomous retransmission of the packet 2 and 4 to the path 2.

At T=7: The UE transmits the packet 9 to the path 2.

According to the present invention, it is helpful for fast recovery of the problematic path by autonomously retransmitting of the packets, which were transmitted to the problematic path but not successfully delivered.

Figure 12:
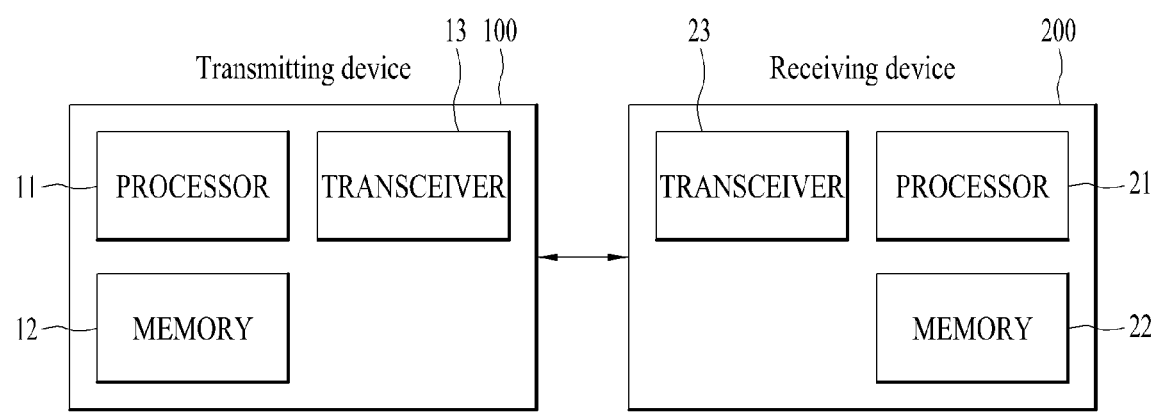
FIG. 12 is a block diagram illustrating an example of elements of a transmitting device 100 and a receiving device 200 according to some implementations of the present disclosure

This invention can be applicable for a case where when a radio bearer is configured with more than one associated logical channel FIG. 12 is a block diagram illustrating an example of elements of a transmitting device 100 and a receiving device 200 according to some implementations of the present disclosure.

The transmitting device 100 and the receiving device 200 respectively include transceivers 13 and 23 capable of transmitting and receiving radio signals carrying information, data, signals, and/or messages, memories 12 and 22 for storing information related to communication in a wireless communication system, and processors 11 and 21 operationally connected to elements such as the transceivers 13 and 23 and the memories 12 and 22 to control the elements and configured to control the memories 12 and 22 and/or the transceivers 13 and 23 so that a corresponding device may perform at least one of the above-described implementations of the present disclosure.

The memories 12 and 22 may store programs for processing and controlling the processors 11 and 21 and may temporarily store input/output information. The memories 12 and 22 may be used as buffers. The buffers at each protocol layer (e.g. PDCP, RLC, MAC) are parts of the memories 12 and 22.

The processors 11 and 21 generally control the overall operation of various modules in the transmitting device and the receiving device. Especially, the processors 11 and 21 may perform various control functions to implement the present disclosure. For example, the operations occurring at the protocol stacks (e.g. PDCP, RLC, MAC and PHY layers) according to the present disclosure may be performed by the processors 11 and 21. The protocol stacks performing operations of the present disclosure may be parts of the processors 11 and 21.

The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. The present disclosure may be implemented using firmware or software, and the firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the transceiver 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transceiver 13 may include an oscillator. The transceiver 13 may include Nt (where Nt is a positive integer) transmission antennas.

A signal processing process of the receiving device 200 is the reverse of the signal processing process of the transmitting device 100. Under control of the processor 21, the transceiver 23 of the receiving device 200 receives radio signals transmitted by the transmitting device 100. The transceiver 23 may include Nr (where Nr is a positive integer) receive antennas and frequency down-converts each signal received through receive antennas into a baseband signal. The processor 21 decodes and demodulates the radio signals received through the reception antennas and restores data that the transmitting device 100 intended to transmit.

The transceivers 13 and 23 include one or more antennas. An antenna performs a function for transmitting signals processed by the transceivers 13 and 23 to the exterior or receiving radio signals from the exterior to transfer the radio signals to the transceivers 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An transceiver supporting a MIMO function of transmitting and receiving data using a plurality of antennas may be connected to two or more antennas. The transceivers 13 and 23 may be referred to as radio frequency (RF) units.

In the implementations of the present disclosure, a UE operates as the transmitting device 100 in UL and as the receiving device 200 in DL. In the implementations of the present disclosure, a BS operates as the receiving device 200 in UL and as the transmitting device 100 in DL. Hereinafter, a processor, a transceiver, and a memory included in the UE will be referred to as a UE processor, a UE transceiver, and a UE memory, respectively, and a processor, a transceiver, and a memory included in the BS will be referred to as a BS processor, a BS transceiver, and a BS memory, respectively.

The UE processor can be configured to operate according to the present disclosure, or control the UE transceiver to receive or transmit signals according to the present disclosure. The BS processor can be configured to operate according to the present disclosure, or control the BS transceiver to receive or transmit signals according to the present disclosure.

The processor 11 (at a UE and/or at a BS) checks whether there is a UL grant or DL assignment for a serving cell in a time unit. If there is a UL grant or DL assignment for the serving cell in the time unit, the processor 11 checks whether a data unit is actually present on the UL grant or DL assignment in the time unit, in order to determine whether to restart a deactivation timer associated with the serving cell which has been started. The processor 11 restarts the deactivation timer associated with the serving cell in the time unit if there is a data unit present on the UL grant or DL assignment in the time unit. The processor 11 does not restart the deactivation timer associated with the serving cell in the time unit if there is no data unit present on the UL grant or DL assignment in the time unit, unless another condition that the processor 11 should restart the deactivation timer is satisfied. The processor 11 does not restart the deactivation timer associated with the serving cell in the time unit if there is no data unit present on the UL grant or DL assignment in the time unit and if an activation command for activating the serving cell is not present in the time unit. The processor 11 may be configured to check whether a data unit is actually present on the UL grant or DL assignment on the serving cell in the time unit in order to determine whether to restart the deactivation timer of the serving cell, if the UL grant or DL assignment is a configured grant/assignment which is configured by RRC to occur periodically on the serving cell. The processor 11 may be configured to check whether a data unit is actually present on the UL grant or DL assignment on the serving cell in the time unit in order to determine whether to restart the deactivation timer of the serving cell, if the UL grant or the DL assignment is a dynamic grant/assignment which is indicated by a PDCCH. The processor 11 may be configured to check whether a data unit is actually present on the UL grant or DL assignment on the serving cell in the time unit in order to determine whether to restart the deactivation timer of the serving cell, if the serving cell is a SCell of the UE. The processor 11 (at the UE and/or the BS) deactivates the serving cell upon expiry of the deactivation timer associated with the serving cell.

In the present disclosure, a user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a wearable device (e.g., a smartwatch, a smartglass, or head mounted display (HMD)), and the like. The HMD may be, for example, a type of display device that is worn on the head. For example, the HMD may be used to implement virtual reality (VR), augmented reality (AR), or mixed reality (MR).

In the present disclosure, an unmanned aerial vehicle (UAV) may be, for example, an aircraft without a human being onboard, which aviates by a wireless control signal. In the present disclosure, a VR device may include, for example, a device for implementing an object or a background of the virtual world. The AR device may include, for example, a device implemented by connecting an object or a background of the virtual world to an object or a background of the real world. In the present disclosure, a MR device may include, for example, a device implemented by merging an object or a background of the virtual world into an object or a background of the real world. In the present disclosure, a hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. In the present disclosure, a MTC device and a IoT device may be, for example, devices that do not require direct human intervention or manipulation. For example, the MTC device and the IoT device may include smartmeters, vending machines, thermometers, smartbulbs, door locks, or various sensors. In the present disclosure, a medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. In the present disclosure, a security device may be, for example, a device installed to prevent a danger that may arise and to maintain safety. For example, the security device may be a camera, a CCTV, a recorder, or a black box. In the present disclosure, a FinTech device may be, for example, a device capable of providing a financial service such as mobile payment. For example, the FinTech device may include a payment device or a point of sales (POS) system. The weather/environment device may include, for example, a device for monitoring or predicting a weather/environment.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

The implementations of the present disclosure are applicable to a network node (e.g., BS), a UE, or other devices in a wireless communication system.

What is claimed is:

1. A method for transmitting a packet by a Packet Data Convergence Protocol (PDCP) entity of a user equipment in a wireless communication system, the method comprising:
    delivering a first packet to a first Radio Link Control (RLC) entity and a second packet to a second RLC entity;
    transmitting the first and second packets through the first and second RLC entities; and
    based on detecting a radio link failure (RLF) related to the first RLC entity, retransmitting the first packet through the second RLC entity based on not receiving acknowledgement information of the first packet from the first RLC entity,
    wherein, based on not receiving acknowledgement information of the second packet from the second RLC entity, the first packet is retransmitted through the second RLC entity after a retransmission of the second packet, and
    wherein, based on receiving the acknowledgement information of the second packet from the second RLC entity and delivering a third packet to the second RLC entity for an initial transmission, the first packet is retransmitted through the second RLC entity prior to the initial transmission of the third packet.

2. The method of claim 1, further comprising receiving retransmission triggering information for the first packet from an upper layer entity, when the RLF is detected.

3. The method of claim 2,
    wherein the upper layer entity is a radio resource control (RRC) entity,
    wherein the RRC entity determines whether the RLF related to the first RLC entity is detected or not.

4. The method of claim 2, wherein the first packet is retransmitted through the second RLC entity without any indication of a network.

5. The method of claim 2, wherein the retransmission triggering information for the first packet is generated by the upper layer entity.

6. A user equipment (UE) in a wireless communication system, the UE comprising:
    a memory; and
    at least one processor coupled to the memory and configured to:
        deliver a first packet to a first Radio Link Control (RLC) entity and a second packet to a second RLC entity by a Packet Data Convergence Protocol (PDCP) entity;
        transmit the first and second packets through the first and second RLC entities; and
        based on detecting a radio link failure (RLF) related to the first RLC entity, retransmit the first packet through the second RLC entity by the PDCP entity based on not receiving acknowledgement information of the first packet from the first RLC entity,
    wherein, based on not receiving acknowledgement information of the second packet from the second RLC entity, the first packet is retransmitted through the second RLC entity after a retransmission of the second packet, and
    wherein, based on receiving the acknowledgement information of the second packet from the second RLC entity and delivering a third packet to the second RLC entity for an initial transmission, the first packet is retransmitted through the second RLC entity prior to the initial transmission of the third packet.

7. The UE of claim 6, wherein the at least one processor is further configured to receive retransmission triggering information for the first packet from an upper layer entity by the PDCP entity, when the RLF is detected.

8. The UE of claim 7,
    wherein the upper layer entity is a radio resource control (RRC) entity,
    wherein the RRC entity determines whether the RLF related to the first RLC entity is detected or not.

9. The UE of claim 7, wherein the first packet is retransmitted through the second RLC entity without any indication of a network.

10. The UE of claim 7, wherein the retransmission triggering information for the first packet is generated by the upper layer entity.

11. The UE of claim 6, wherein the at least one processor is further configured to implement at least one advanced driver assistance system (ADAS) function based on signals that control the UE.

* * * * *